United States Patent [19]

Cathenaut

[11] Patent Number: 5,516,540
[45] Date of Patent: May 14, 1996

[54] PROCESS FOR MAKING ARTICLES OF ICE CONFECTIONERY

[75] Inventor: Philip I. Cathenaut, Beauvais, France

[73] Assignee: Nestec S.A., Vevey, Switzerland

[21] Appl. No.: 206,111

[22] Filed: Mar. 4, 1994

[30] Foreign Application Priority Data

Mar. 27, 1993 [EP] European Pat. Off. .............. 93105076

[51] Int. Cl.$^6$ ...................................................... A23G 9/26
[52] U.S. Cl. ........................... 426/249; 426/91; 426/134; 426/779; 426/282; 426/302; 426/389; 426/421; 426/512; 426/515; 425/126.2; 425/225; 425/259; 425/348 R; 425/451; 425/547; 62/345
[58] Field of Search .................... 426/249, 279, 426/282, 302, 389, 421, 512, 515, 134, 91, 95; 425/126.2, 225, 259, 348 R, 451, 547, 576; 62/345

[56] References Cited

U.S. PATENT DOCUMENTS

| | | | |
|---|---|---|---|
| 1,948,147 | 2/1934 | Warren | 107/19 |
| 2,087,729 | 7/1937 | Cowling | 107/54 |
| 2,980,039 | 4/1961 | Jolly | 426/515 X |
| 3,031,978 | 5/1962 | Rasmusson | 107/8 |
| 3,296,822 | 1/1967 | Grom | 476/515 X |
| 3,411,463 | 11/1968 | Moseres | 426/421 X |
| 3,770,460 | 11/1973 | Vroman | 426/279 |
| 4,104,411 | 8/1978 | Pooler | 426/421 |
| 4,192,760 | 3/1980 | Jünger et al. | 252/79 |
| 4,239,175 | 12/1980 | Straubinger | 426/515 X |
| 4,244,470 | 1/1981 | Burnham | 426/515 X |
| 4,324,108 | 4/1982 | Billett et al. | 62/345 |
| 4,335,583 | 1/1982 | Billett | 62/345 |
| 4,396,367 | 8/1983 | Gram | 425/441 |
| 4,425,089 | 1/1984 | Billett et al. | 425/126.2 |
| 4,477,473 | 10/1984 | Schoonmaker et al. | 426/515 X |
| 4,507,070 | 3/1985 | Armstrong et al. | 425/126.2 |
| 4,548,045 | 10/1985 | Altares et al. | 62/345 X |
| 4,548,573 | 10/1985 | Waldström | 425/442 |
| 4,557,117 | 12/1985 | Furia et al. | 426/421 X |
| 4,576,562 | 3/1986 | Anderson | 62/345 X |
| 4,699,583 | 10/1987 | Grigeli et al. | 62/345 |
| 4,746,523 | 5/1988 | Binley | 425/126.2 |
| 4,761,128 | 8/1988 | Fowler et al. | 425/126.2 |
| 4,767,307 | 8/1988 | Beer | 62/341 X |
| 4,819,449 | 4/1989 | Curti et al. | 62/345 |
| 5,343,710 | 9/1994 | Cathenaut et al. | 62/71 |
| 5,374,436 | 12/1994 | White et al. | 426/249 |

FOREIGN PATENT DOCUMENTS

| | | |
|---|---|---|
| 365150 | 1/1981 | Austria . |
| 0201141A2 | 12/1986 | European Pat. Off. . |
| 0201141A3 | 12/1986 | European Pat. Off. . |
| 0322469A1 | 7/1989 | European Pat. Off. . |
| 1078744 | 8/1967 | United Kingdom . |

*Primary Examiner*—Donald E. Czaja
*Assistant Examiner*—Milton I. Cano
*Attorney, Agent, or Firm*—Vogt & O'Donnell

[57] ABSTRACT

Articles of ice confectionery are prepared in a cavity formed by a complementary countermould and master mould assembly into which a composition for forming an ice confectionery is introduced. The assembly is cooled for freezing the confectionery composition which then is demoulded in two steps wherein the countermould is heated and removed first and the master mould is heated second for removal of the frozen article.

11 Claims, 4 Drawing Sheets

PROCESS FOR MAKING ARTICLES OF ICE CONFECTIONERY

BACKGROUND OF THE INVENTION

This invention relates to moulding articles of iced confectionery having a convex part, more particularly ice lollies quasi-ellipsoidal in shape.

Many small articles of ice confectionery with or without sticks are made by moulding in generally metallic moulds. These moulds may comprise one or more parts, and in the latter case, the various parts of the mould have to be separated during demoulding of the articles.

To make ice lollies having a convex part, for example quasi-ellipsoidal in shape, a rounded shape has to be given to the articles in the upper part of the mould. This operation cannot be carried out in one-piece metal moulds because one-piece metal moulds inevitably lead to the formation of a flat upper face dictated by the filling of the liquid ice composition. In addition, to demould the articles from these metal moulds, the mould cavity must not have a recessed upper part because otherwise, the article would not be demouldable.

In French Patent Application No. 2 535 581, an attempt was made to solve the problem of making so-called "non-demouldable" articles by using metal moulds in the form of two opposite, longitudinally hinged profiled half-shells. Held firmly against one another, the half-shells are filled with ice composition through an upper opening and, after the insertion of a stick, the half-shells thus filled are cooled in a cold-air freezing tunnel and then heated so that they may finally be opened to release the moulded articles.

Another method which is described in French Patent Application No. 2 502 467 comprises using half-shells which have a rounded profile in their inner part, but no external relief, and which fit longitudinally into a master mould with which they remain in contact. The master mould containing the two half-shells is cooled in a tank of refrigerating liquid (brine or glycol-containing water) which represents an advantage over the more expensive tunnel cooling. However, to demould the articles, the two half-shells have to be vertically removed from the master mould and then laterally separated to release the article. These operations involve the use of relatively complex and unwieldy mechanical extraction and demoulding tools.

Another process which is described in French Patent Application No. 2 265 283 comprises using moulds with thin flexible walls of rubber which can be turned inside out like gloves to demould the articles. However, this process involves certain risks where the relatively fragile flexible moulds are in contact with the cooling fluid.

Another process, the die-stamping process described for example in European Patent Application No. 39 511, uses a single mould. After demoulding, the lolly is deformed between two dies under the action of two press elements which form countermoulds. This process has the disadvantage that it does not produce particularly precise shapes, as reflected in particular in the presence of flash along the separation line between the two countermoulds.

SUMMARY OF THE INVENTION

The problem addressed by the present invention was to provide a process which would not be attended by any of the disadvantages of known processes.

The present invention provides a process wherein an article of ice confectionery is formed in a cavity between a master mould and a countermould and then demoulded in two steps wherein the countermould is removed first and then the article is removed from the master mould. To form the article in the cavity, a composition for forming an ice confectionery article is introduced through an opening in the countermould to fill the cavity, and the countermould and master mould are cooled to form a frozen article. To remove the countermould and article, the countermould is heated to release the countermould from the frozen article and then removed from the article and master mould, and then the master mould is heated to release the frozen article from the master mould for removal of the ice confectionery article.

With more particularity, a process according to the invention comprises:
placing in an open metal master mould, of which the base forms a half-cavity and of which the upper part is widened upwards, a countermould complementary to the master mould and consisting of a piece of solid metal frustoconical in shape adjusted to the master mould which is recessed in the shape of a downwardly facing half-cavity so as to form a cavity with the master mould and which is formed with an opening in its upper part, introducing an ice confectionery composition into the cavity through the opening,
cooling the composition,
optionally introducing a stick through the opening into the partly hardened composition,
heating the countermould and then removing it from the master mould,
heating the master mould and then demoulding the article which is removed,
replacing the countermould in the master mould and washing the master mould and the countermould at a washing station.

DETAILED DESCRIPTION OF THE INVENTION AND PREFERRED EMBODIMENT

Figure 1:
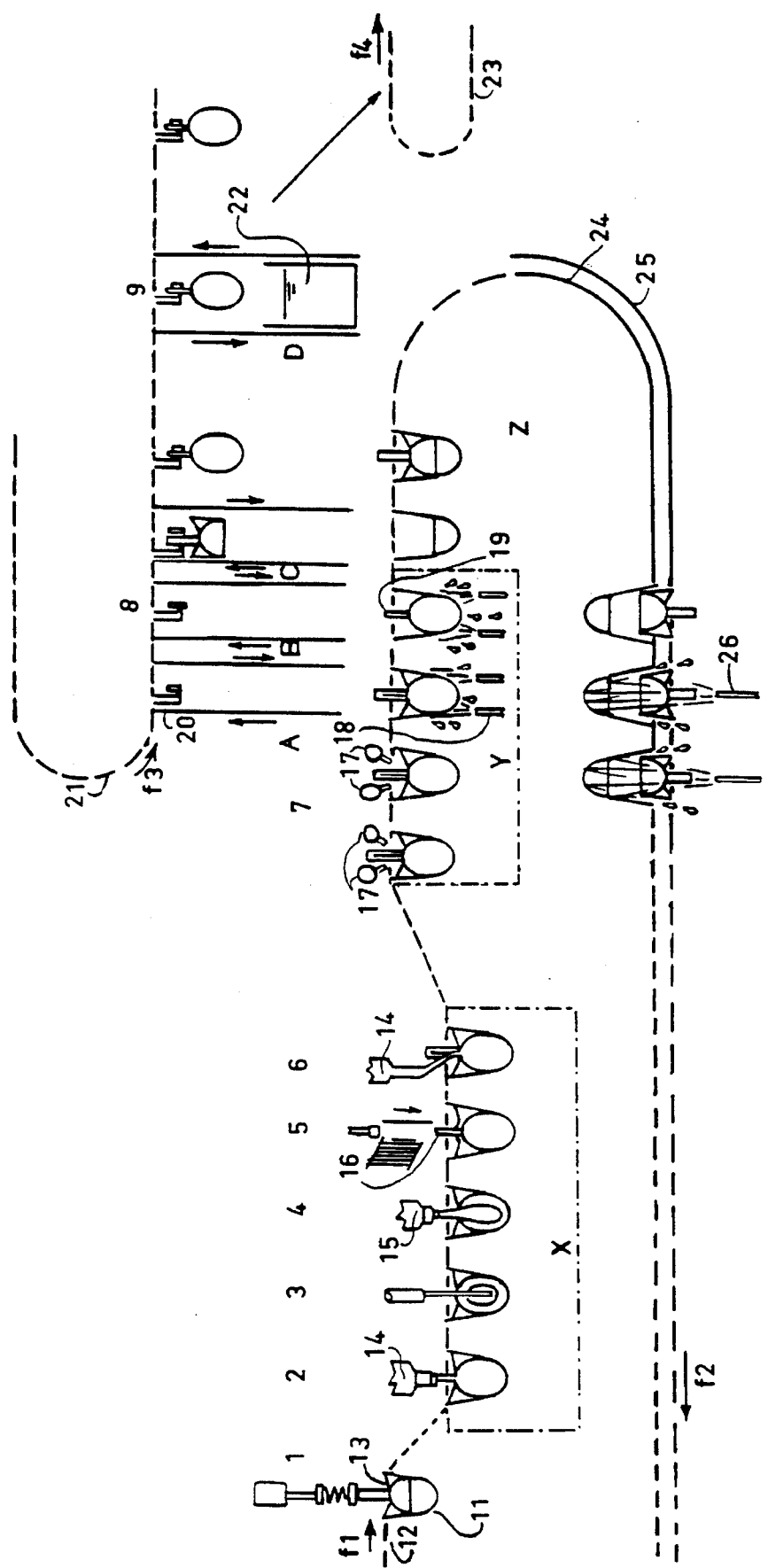

In a preferred embodiment, the master mould and the countermould in contact with the master mould are cooled by passage through a tank of freezing liquid, for example brine or glycol-containing water, throughout the operations preceding heating of the countermould.

In one particular embodiment leading to composite products, the step in which the ice composition is introduced is followed by a step in which the still liquid composition is drawn under suction to the centre of the cavity to form a shell and then by a second filling step in which the empty space is filled with a second ice composition and, in the case of an ice lolly, prior to insertion of the stick. These steps of suction and filling of the empty space may be repeated several times which leads to layered products.

In the case of ice lollies, the step in which the stick is inserted is preferably followed by final filling of the space close to the opening.

After demoulding, the articles are preferably glazed and coated, such as by immersion in water to give them a protective surface glaze which may also serve a decorative purpose. Alternatively, they may be dip-coated with chocolate.

The process is carried out with a machine which is characterized in
a moulding assembly consisting of a master mould and a complementary countermould,
a support bar for the master moulds fixed to an endless chain conveyor, a support bar for the countermoulds which travels in the same direction as the endless chain conveyor and which is designed to separate therefrom for removal and then on its return level, means for cooling the moulding assembly, means for introducing ice composition into the moulding assembly, optionally means for inserting a stick into the partly hardened ice composition, means for heating the master moulds and countermoulds, a unit for vertically removing the countermoulds and the moulded products and for vertically replacing the countermoulds in the empty master moulds, an endless chain conveyor for removing the moulded articles and means for washing the master moulds and countermoulds.

The process also is carried out with an assembly which is characterized a master mould comprising a lower half-cavity demouldable in a downward vertical direction relative to the article, an upwardly widening upper wall and an annular shoulder between the lower half-cavity and the upper wall, and a countermould complementary to the master mould which is demouldable in an upward vertical direction relative to the article; of which the outer part coincides perfectly with the inner wall of the upper part of the master mould; which consists of a piece of solid metal frusto-conical in shape recessed into a downwardly facing half-cavity to form the moulding cavity with the master mould; and which is formed with an opening in its upper part, the said piece of metal comprising a lower chamfer resting on the shoulder of the master mould and gripping bars in its upper part.

The master mould supports the countermould by means of the shoulder at the limit of its lower half-cavity, the countermould thus covering the article. The shoulder preferably has a taper angle so calculated that it widens upwards, this taper angle corresponding to a slope complementary to the lower chamfer of the countermould while creating a certain clearance between the master mould and the countermould.

By virtue of its continuity, the master mould separates both the product and the countermould from the refrigerating fluid. In addition, the contact between the upper inner wall of the master mould and the outer wall of the countermould ensures the transfer of heat between the refrigerating fluid and the product.

The invention is described in more detail in the following with reference to the accompanying drawings which illustrate one example of embodiment of the invention.

BRIEF DESCRIPTION OF THE DRAWINGS FIGURES

FIG. 1 is a general plan of the machine showing the various stations involved in the production of an ice lolly quasi-ellipsoidal in shape.

FIGS. 2 to 13 diagrammatically illustrate the various sequences involved in the gripping of the countermould and of the article and the reinsertion of the countermould into the master mould when the machine is started up and in the course of production.

Figure 14:
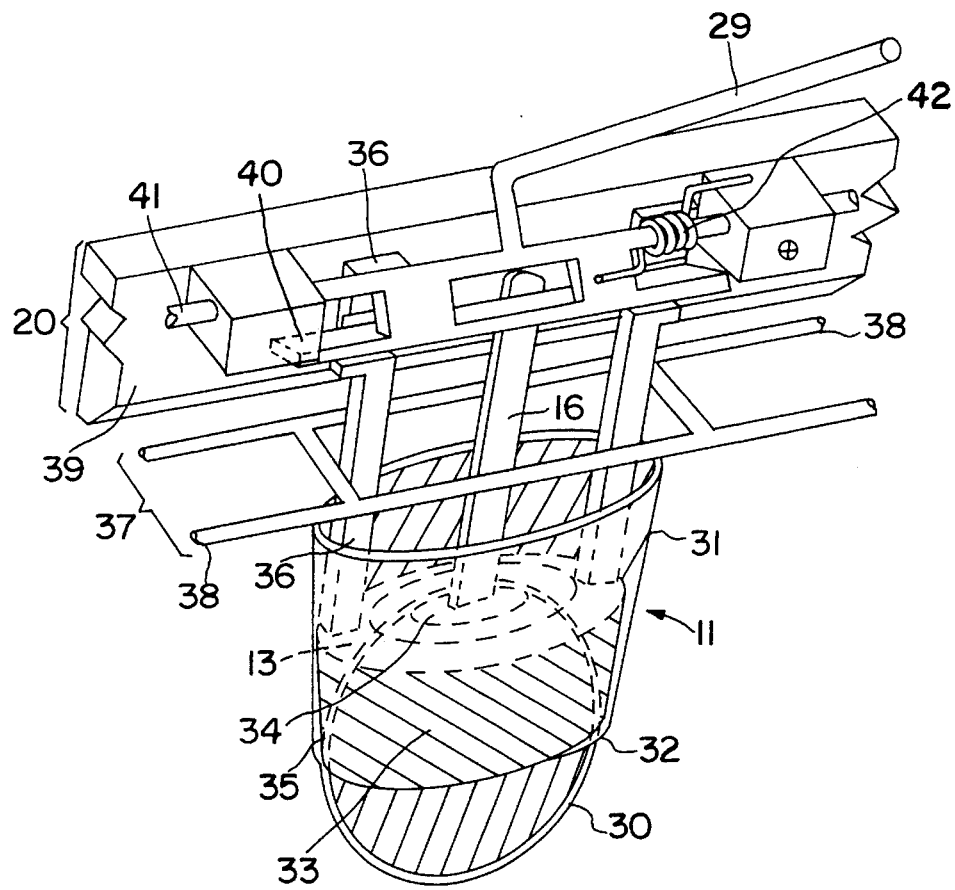

FIG. 14 diagrammatically illustrates the moulding assembly, the means for gripping the countermould and the stick and means for supporting the countermould on the return level of the chain conveyor.

Figure 15:
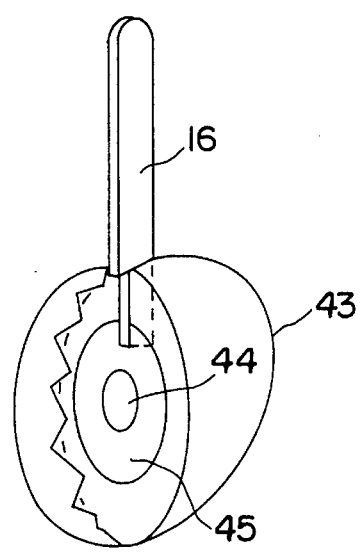

FIG. 15 is a view of and partial section through an ice lolly on a stick obtained in accordance with the plan shown in FIG. 1.

DETAILED DESCRIPTION OF THE DRAWING FIGURES

Referring to FIG. 1, the machine comprises a freezing zone X, a surface heating zone Y and a zone Z with no freezing or heating means. The freezing zone consists of a tank containing a cooling fluid, for example a brine containing calcium chloride or glycol-containing water. In the interests of simplicity of the drawing, the distances shown for the various zones X, Y and Z do not correspond to the actual distances required for the appropriate transfer of heat. In addition, some elements have not been shown in the interests of clarity. For example, only one master mould and one countermould have been shown although plates carrying rows of master moulds and bars supporting corresponding rows of countermoulds are used in practice. Thus, the plates of master moulds are pivotally connected to an endless transporting chain and form a conveyor. Similarly, the bars of countermoulds form the links of a parallel endless chain of which only part of the return level has been shown. The terms "master mould" and "countermould" will be used hereinafter to designate the rows. In the case illustrated, that of a first type of machine, the space occupied by a removal bar is the same as that occupied by a row of moulds. This is a simplified representation because there are machines of a second type where the space occupied by a removal bar is wider than that occupied by a row of moulds and, in this case (not shown in FIG. 1), the raising and lowering mechanisms have to be separated by a distance corresponding to two rows of moulds.

A master mould 11 moves from left to right in the direction of arrow f1 through the step-by-step advance of the endless chain 12, a step being defined as the distance between two consecutive master moulds, and arrives successively beneath the stations 1 to 10.

At station 1, which is at the head of the line and outside the zone X, the countermould 13 is vertically applied firmly against the master mould 11, for example by means of a jack provided with a spring stop, so that the outer face of the countermould comes fully into contact with the inner face of the upper part of the master mould 11. The master mould 11 and the countermould 13 form the moulding assembly which is in contact with the cooling fluid. As described above, and as illustrated in FIG. 1, and also in FIG. 2–13, because of the frustoconical shape of the side surface of the countermould 13, the upper end has a diameter greater than that of the lower end which, as shown and described, surrounds an opening and from which extends a surface recessed from the lower end, and hence the lower end opening, to define the countermould 13 cavity. The opening in the upper end is suitable for introduction of the confectionery and passes through the body of countermould 13 from the upper end to the countermould cavity.

At station 2, the cavity formed between the master mould and the countermould is almost completely filled with an ice confectionery composition 14. Under the effect of the cooling fluid, the composition begins to solidify and to form a shell, remaining liquid at its centre. The centre is removed at 3. At station 4, another ice composition 15 is introduced into the core. At 5, the centre has reached the viscosity required for the stick 16 to be able to be introduced and remain in position. At station 6, filling of the top of the cavity with the composition 14 is completed.

The moulding assembly then leaves the freezing zone X and enters the heating zone Y. At 7, the countermould is surface-heated from the top by nozzles 17 delivering a hot fluid, for example steam and/or hot air (the provision of heat electrically generated, for example, by radiation or induction, could also perform this function). At 8, the jets of water or hot brine are projected by the nozzles 18 onto the surface of the master mould 11 from the bottom and enable the ice lolly 19 to be demoulded. At the same time, the three raising and lowering mechanisms A, B and C simultaneously raise the countermould 13 for A, raise the ice lolly 19 for B and replace the countermould 13 in the master mould 11 for C by means of grippers 20 fixed to the endless chain 21, as will be explained in more detail hereinafter with reference to FIGS. 2 to 8. The chain 21 advances two steps at a time and removes the ice lolly 19 towards the station 9 where it is immersed in a chocolate-flavoured coating composition or glazing composition 22, for example in the form of cold water to give it a surface glaze, for example by means of a tank ordinarily used to apply a chocolate-flavoured coating by means of the raising and lowering mechanism D. The coated lolly is then discharged and removed in the direction of arrow f4 by the conveyor belt 23 towards a packing station where it is wrapped, for example in a flow pack (not shown).

In the no-freezing zone Z consisting of cold ambient air, the moulding assembly comprising the master mould 11 and the corresponding countermould 13 is returned on the return level of the chain 12 which travels in the direction of arrow f2. The master mould 11 rests on the rail 24 whereas the countermould 13 is supported by a bar resting on the rail 25. In this position, the master mould, which is fixed to the chain 12, entrains the associated countermould 13 while being kept at a distance therefrom. At the station 10, jets of cleaning liquid, preferably hot cleaning liquid, are projected upwards by the nozzles 26 and spray both the countermould 13 and the master mould 11 so that the master mould and countermould are carefully cleaned in a single operation.

The removal and transfer sequences of the countermould 13 and the ice lolly 19 at the station 8 are shown in detail in FIGS. 2 to 13 which illustrate the case of a machine of the second type mentioned above for which the width of a removal bar is such that the removal bars have to be provided every two rows of moulds.

Before production commences, the moulding assembly has to be prearranged in a certain way, i.e. in such a way that all the master moulds 11 installed in the machine are equipped with their complementary countermoulds 13 except for three, namely that which corresponds to the raising and lowering mechanism B for removing the ice lolly 19 plus two on either side. The reason for this is that, since it is here that the ice lolly 19 is removed from the master mould, there should be no countermould 13 at this point to create an obstacle. When the machine is started up for the first time, this correspondence between the three master moulds 11 without countermoulds 13 and the raising and lowering mechanism B has to be manually established.

Figure 2:
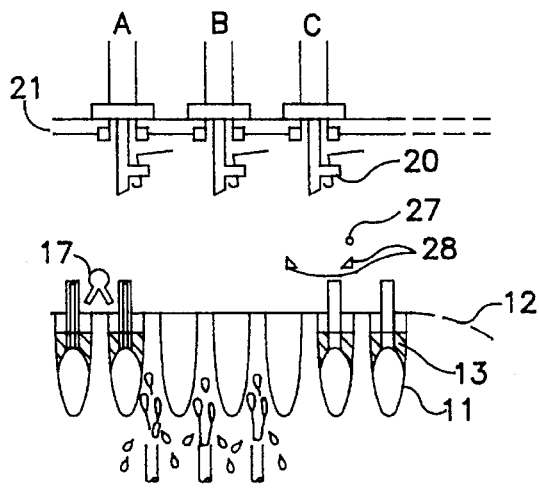

In FIG. 2, the chain 12 has just advanced by one step. It is stationary. There is no countermould 13 at the level of the raising and lowering mechanism B. The synchronized raising and lowering mechanisms A, B and C are in a position to descend. The first products arrive at the raising and lowering mechanism A. The raising and lowering mechanism C is equipped with a bar 27 for opening the grips 20 and with guides 28 for the countermoulds 13, the opening bar 27 and the guides 28 being fixed.

Figure 3:
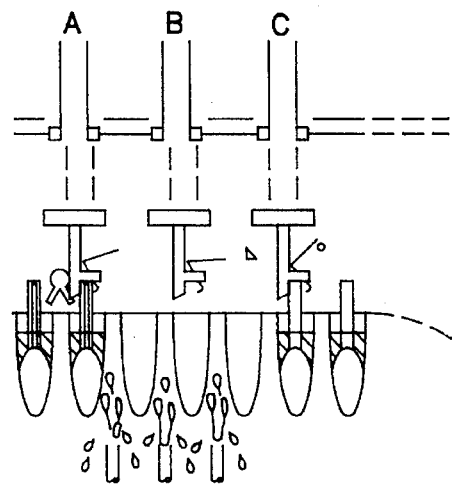

As shown in FIG. 3, the raising and lowering mechanism A descends and takes up the countermould 13. At the same time, the raising and lowering mechanism B descends but does not grip anything because there is still no product at this level. The raising and lowering mechanism C also descends at the same time and does not replace anything because the countermould 13 is already installed in the corresponding master mould 11. The raising and lowering mechanisms A, B and C return to their upper positions.

Figure 4:
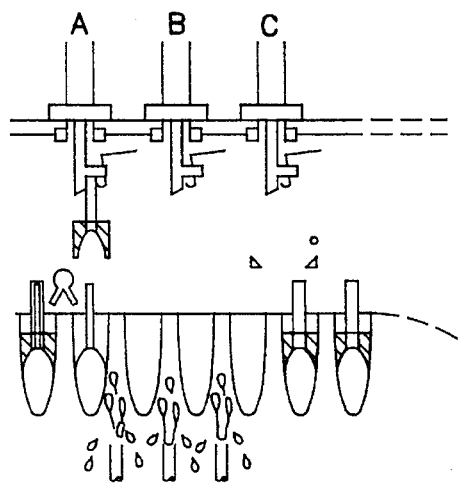
Figure 5:
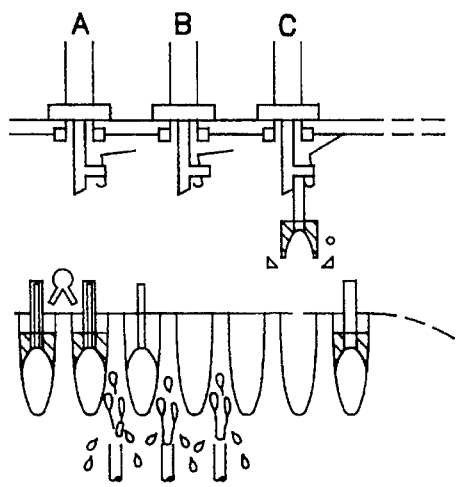

When, as shown in FIG. 4, the raising and lowering mechanisms A, B and C have returned to their upper position, the chain 12 advances by one step and the chain 21 by two steps which leads to the arrangement shown in FIG. 5. The ice lolly 19 has still not been placed beneath the raising and lowering mechanism B whereas the complementary countermould 13 has moved into position at the level of the raising and lowering mechanism C. The preceding master mould 11 has its complementary countermould 13 suspended at the level of the raising and lowering mechanism C.

Figure 6:
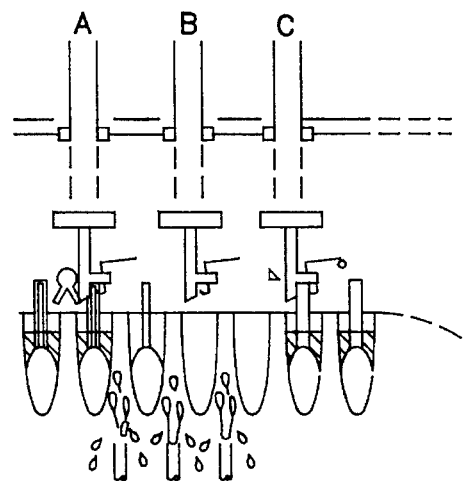
Figure 7:
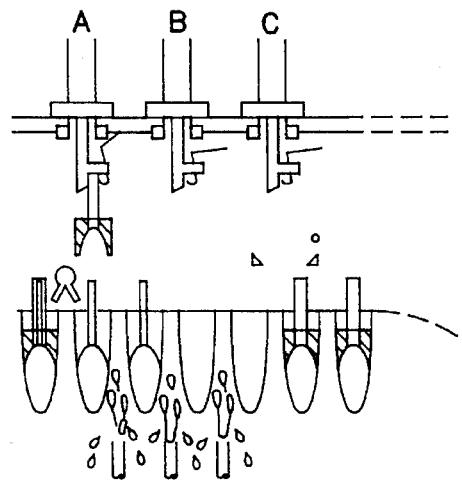

FIGS. 6 and 7 also illustrate the removal of a countermould 13 and the replacement of the countermould removed in FIG. 4. FIG. 6 shows how the opening bar 27 acts on the lever 29 of the gripper 20 during the descent of the raising and lowering mechanism C to open and release the countermould 13.

Figure 8:
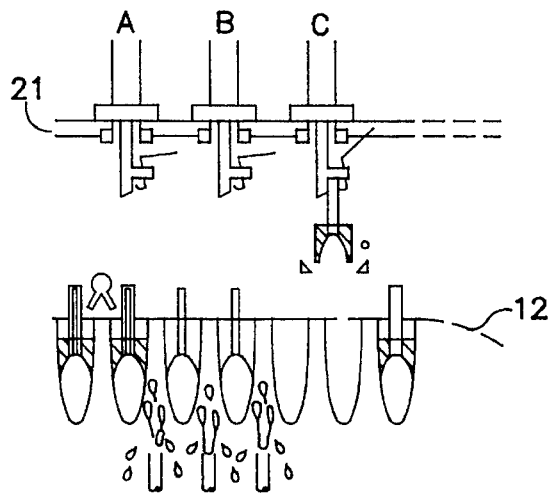

FIG. 8 shows the arrangement of the master moulds 11 after a one-step advance and the arrangement of the countermoulds 13 after a two-step advance.

Figure 9:
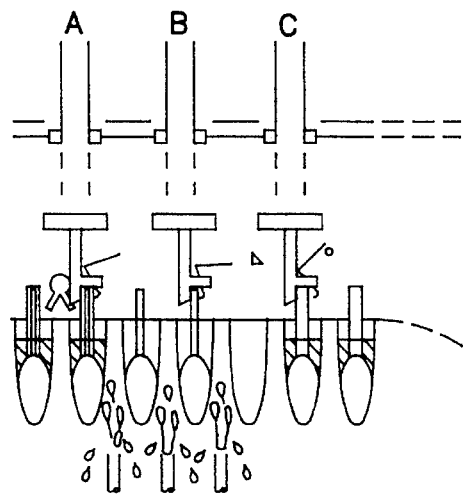
Figure 10:
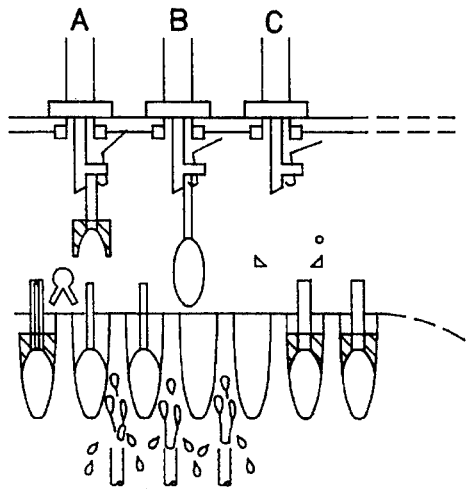

FIGS. 9 and 10 illustrate the descent of the raising and lowering mechanisms A, B and C, the removal of the countermould 13 and the ice lolly 19 and the placing of the countermould 13 in the master mould 11 under normal production conditions.

Figure 11:
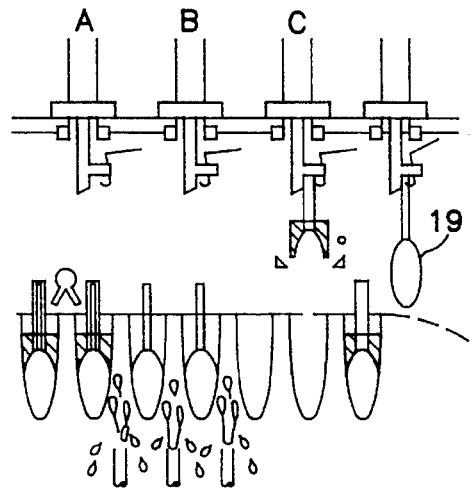

The chain 12 advances by one step and the chain 21 by two steps which leads to the configuration shown in FIG. 11.

Figure 12:
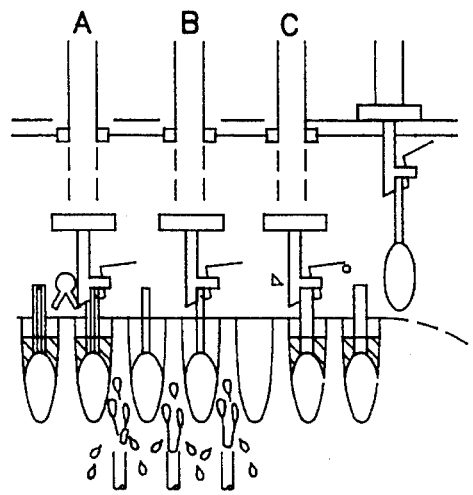
Figure 13:
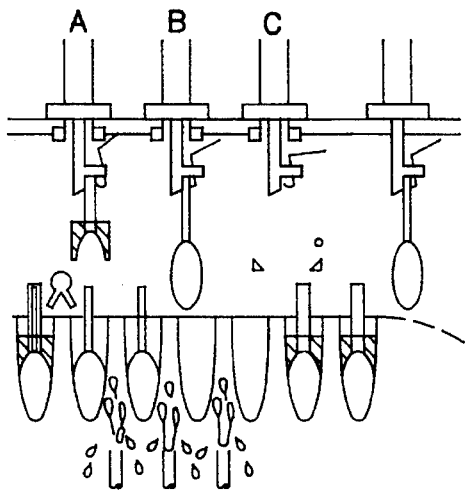

FIGS. 12 and 13 illustrate the beginning of a new cycle, the products being transported towards the coating and packing stations.

In the case of a machine of the first type described above, where the space occupied by a removal bar is no wider than that of a row of moulds, there is no row of moulds between the raising and lowering mechanisms A and B or between the raising and lowering mechanisms B and C. Accordingly, FIGS. 6, 7 and 8 become redundant.

In FIG. 14, the moulding assembly consists of: a master mould 11 comprising a lower half-cavity 30 demouldable in a downward vertical direction relative to the article; an upper wall 31 widened upwards; an annular shoulder 32 between the half-cavity 30 and the wall 31; and a countermould 13 (represented by dashed lines) complementary to the master mould 11 which is demouldable in an upward vertical direction relative to the article and of which the outer part coincides perfectly with the inner wall of the upper part of the master mould 11.

The countermould 13 consists of a piece of solid metal frustoconical in shape which is recessed into a downwardly facing half-cavity 33 to form the moulding cavity with the master mould 11 and which is formed with an opening 34 in its upper part, the metal part in question comprising a lower chamfer 35 resting on the shoulder 32 of the master mould 11 and small gripping bars 36 in its upper part. The gripping bars 36 are longer and thicker than the stick 16. The bar 37 made of thick stainless steel wire comprises lateral members 38 (in relation to the direction of travel of the master moulds 11) of which the spacing is greater than the thickness of the upper part of the countermould 13 even though, when the countermould is returned on the return level of the chain 12, it rests on the bar 37 and is kept at a distance from the associated master mould without being completely separated therefrom with the result that the chain 12 entrains the moulding assembly.

The means for gripping the countermould 13 and the stick 16 consists of a gripper 20 with a fixed part 39 and a movable jaw 40—designed to pivot about the pivot 41—which first grip round the bars 36 of the countermould 13 under the effect of the helical spring 42 if a countermould 13 is present due to the fact that a bar 36 is thicker than a stick 16. When the countermould 13 is raised by the raising and lowering mechanism A, it entrains the bar 37, the assembly is transported by the chain 21 and the countermould 13 is replaced in the corresponding master mould 11 by the raising and lowering mechanism C after release by opening of the gripper 20 when the lever 29 comes into contact with the bar 27, the bar 37 being replaced on its guide rail. In the absence of a countermould 13, i.e. at the level of the raising and lowering mechanism B, the gripper takes up the stick 16. The lever 29 is used to open the gripper 20 by striking an opening bar (not shown) so that the stick is released after coating and then deposited onto the conveyor 29 which transports it to the wrapping station.

The ice lolly shown in FIG. 15 may consist, for example, of an outer layer 43 of yellow lemon-flavoured water ice or red strawberry-flavoured water ice or orange orange-flavoured water ice or even green pistachio-flavoured water ice, the layer 43 being coated with a surface glaze of water. Alternatively, the ice lolly may be coated with a layer of chocolate, for example white chocolate or milk chocolate. The centre 44 and 45 may consist of the same milk chocolate ice cream in the case of a two-flavour lolly or even of a white chocolate ice cream 44 and a milk chocolate ice cream 45 in the case of a three-flavour lolly.

The process according to the invention may be optimally carried out by using a low freezing temperature in the zone X, for example in the range from −30° to −40° C., water or relatively cold heating brine, for example at 15° to 20° C., at station 8 and by the metering of the ice confectionery compositions at as low a temperature as possible compatible with metering, for example at 4° to 6° C., the zone Z being formed solely by relatively cold ambient air, for example at 14° to 15° C. due to the proximity of the freezing zone, for a rate of advance of the chain 12 of 15 to 25 steps per minute. In this way, demoulding losses are minimized and the freezing times reduced.

The foregoing description has been concerned with the production of ice lollies. Stick-free ice confectionery articles could be similarly produced. Articles of this type can be gripped and discharged by means of grippers with points, i.e. tools comprising small spikes associated with a fork surrounding the spikes and making a descending movement in relation to the spikes. In this case, the chain 21 would alternately comprise a countermould gripper 13 and a gripper with points. Articles of the type in question could be moulded, for example, in the shape of fruits, for example lemons, strawberries or oranges.

The foregoing description has been based on a master mould 11 and an associated countermould 13. The explanations in this regard would of course remain valid in the case of rows consisting of a plate containing, for example, 4 to 12 master moulds 11 and a bar supporting 4 to 12 countermoulds 13 on the return level of the chain 12. Without departing from the scope of the invention, the ice confectionery articles could be produced by means of a rotary machine provided with the various stations described above rather than on a production line.

I claim:

1. A process for preparing a frozen article from an ice confectionery composition comprising the steps of:

placing a metal countermold body which confines a cavity together with a metal master mold which confines another cavity, wherein the countermold body has (i) an outer side which extends in a frustoconical shape to define a first end which surrounds an opening and to define a second end having a diameter greater than the diameter of the first end, (ii) a surface which extends and is recessed from the first end to define, together with the first end opening, the countermold body cavity and (iii) a second opening which extends from the second end through the countermold body into the countermold body cavity for passing an ice confectionery composition therethrough and wherein the master mold has a wall surface which defines the master mold cavity and has a frustoconically-shaped surface portion for placing the first end of the countermold body and for contacting the outer side of the countermold body, and wherein the first end of the countermold body is placed into the master mold so that the countermold body and the master mold form a mold assembly cavity;

introducing a composition for forming an ice confectionery article into the mold assembly cavity via the countermold body second opening;

cooling the mold assembly to cool the composition to form a frozen article;

heating the countermold body to release the countermold body from the frozen article and removing the countermold body from the frozen article and master mold;

heating the master mold to release the frozen article from the master mold;

demolding the frozen article from the master mold; and washing the countermold body and the master mold.

2. A process according to claim 1 further comprising transporting a plurality of mold assemblies in rows for composition introduction, cooling, heating and demolding, and after demolding, placing a countermold body in a master mold to reform a mold assembly and then washing the reformed assembly for washing the countermold body and the master mold.

3. A process according to claim 1 or 2 wherein the assembly is cooled by a liquid having a temperature for cooling the assembly for freezing the confectionery composition.

4. A process according to claim 3 wherein the liquid contacts the master mold for cooling the master mold and countermold body.

5. A process according to claim 3 wherein the liquid is selected from the group consisting of brine and glycol-containing water.

6. A process according to claim 3 wherein the liquid has a temperature of from −40° C. to −30° C. and wherein the countermold body and the master mold are heated with a liquid having a temperature of from 15° C. to 20° C.

7. A process according to claim 1 further comprising, during cooling, inserting a stick through the counter-mold body second opening into the composition.

8. A process according to claim 1 or 2 wherein the mold assembly is cooled during introduction of the composition.

9. A process according to claim 1 or 2 further comprising at least once during cooling, freezing the composition to form a shell and then sucking unfrozen composition from the cavity via the countermold body second opening and then introducing a further amount of a confectionery composition.

10. A process according to claim 9 further comprising, prior to adding an amount of confectionery composition to fill the mold assembly cavity, inserting a stick through the countermold body second opening into the mold assembly cavity and then filling the mold assembly cavity with the composition.

11. A process according to claim 1 or 2 further comprising coating the demolded articles with a water glaze.

* * * * *